(12) United States Patent
Wright

(10) Patent No.: US 6,694,625 B1
(45) Date of Patent: Feb. 24, 2004

(54) POWER TOOL

(75) Inventor: Stuart Wright, Timonium, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/465,947

(22) Filed: Dec. 17, 1999

(30) Foreign Application Priority Data

Dec. 18, 1998 (GB) ............................................. 9827947

(51) Int. Cl.⁷ .............................. B23D 49/04; B25F 3/00
(52) U.S. Cl. .............................. 30/392; 30/122; 30/394; 173/29
(58) Field of Search ..................... 30/122, 392, 394, 30/519, 312, 371, 373, 374, 376, 290; 173/29

(56) References Cited

U.S. PATENT DOCUMENTS

| | | | | |
|---|---|---|---|---|
| 1,898,956 A | * | 2/1933 | Harvie | ..................... 83/629 |
| 2,976,436 A | | 3/1961 | Anton | |
| 2,998,830 A | * | 9/1961 | Atkinson | ..................... 30/376 |
| 3,145,449 A | * | 8/1964 | Johnson et al. | ............ 30/392 X |
| 3,270,369 A | * | 9/1966 | Mandell | ................... 30/394 X |
| 3,448,781 A | * | 6/1969 | Angelucci | ..................... 30/392 |
| 3,876,015 A | * | 4/1975 | Kivela | ..................... 30/392 X |
| 4,145,811 A | * | 3/1979 | Kendzior | ..................... 30/394 |
| 4,171,083 A | * | 10/1979 | Lippacher et al. | ............ 227/69 |
| 4,876,793 A | * | 10/1989 | Quaglia | ..................... 30/122 |
| 4,930,583 A | | 6/1990 | Fushiya et al. | |
| 5,185,934 A | * | 2/1993 | Tillman | ..................... 30/392 |
| 5,303,471 A | * | 4/1994 | Liberatoscioli | ............... 30/122 |
| 5,832,611 A | * | 11/1998 | Schmitz | ..................... 30/392 |
| 5,940,977 A | * | 8/1999 | Moores, Jr. | .................. 30/392 |
| 6,138,364 A | * | 10/2000 | Schmitz | ..................... 30/392 |

FOREIGN PATENT DOCUMENTS

| | | |
|---|---|---|
| FR | 2325469 | 4/1977 |
| GB | 955740 | 4/1964 |
| GB | 1515390 | 6/1978 |
| GB | 2158770 | 11/1985 |
| GB | 2162463 | 2/1986 |
| GB | 2276586 | 10/1994 |

* cited by examiner

*Primary Examiner*—Boyer D. Ashley
(74) *Attorney, Agent, or Firm*—Bruce S. Shapiro; John Del Ponti; Michael P. Leary

(57) ABSTRACT

A power tool includes a handle (38) which allows the user to operate the tool via a trigger (44). The handle is arranged relative to the body (36) of the tool such that the user may operate the tool in a plurality of positions relative to a workpiece. The handle (38) is positioned such that a force applied thereto along a line of action allows operation of the tool along that line of action regardless of in which of the plurality of positions the power tool is held relative to the workpiece. Furthermore, the handle (38) is configured to be accessible from more than one side thereof each accessible side corresponding to a given one of the plurality of different positions.

7 Claims, 10 Drawing Sheets

POWER TOOL

BACKGROUND OF THE INVENTION

The present invention relates to a power tool and has particular, although not exclusive, relevance to such power tools which are able to have their modes of operation changed.

Some power tools are capable of operating in more than one mode. For example a power drill may also be used as a screwdriver. All that is generally required is for the drill bit to be replaced by a screwdriver bit and the speed of rotation of the bit be reduced.

Conventionally, tools which may operate in more than one mode, such as the drill/driver are held by the user in the same position or orientation relative to the workpiece in whichever mode the tool is used. In the case of the drill driver, it is only the choice of tool bit which differs—not the way in which the tool is held to be used.

Hitherto, because power tools have been designed to complete only one specific task or a range of common tasks, there has been no need to develop a single tool flexible enough to undertake a range of tasks but also to be operated in a different mode dependent upon the task to be undertaken. For example, a power tool capable of acting in one mode as a panel saw and in another mode as a jigsaw, yet being held and operated by a user differently dependent upon which of these two options is required, would be a very flexible proposition. To date, no tool of such flexibility and utility is known.

SUMMARY OF THE INVENTION

Accordingly it is an object of the present invention to provide a body housing a motor for driving the power tool, the body including a handle to allow a user to manually hold and operate the power tool; a trigger positioned adjacent the handle, the trigger being operable by a user when gripping the handle, wherein the handle is positioned relative to the body such that a user may operate the power tool in a plurality of positions relative to a workpiece, and wherein the handle is positioned such that a force applied thereto along a line of action allows operation of the power tool along that line of action regardless of in which of the plurality of positions the power tool is held relative to the workpiece; the power tool characterised by the handle being configured to be accessible from more than one side, each accessible side corresponding to a given one of the plurality of different positions. Because the handle is accessible from more than one side, then the tool may be used in a different attitude and orientation to a workpiece dependent upon the task to be undertaken.

Preferably the trigger is formed integrally with the handle. Also, the power tool may be operated in two modes, each of which modes corresponds to one of the accessible sides of the handle.

BRIEF DESCRIPTION OF THE DRAWINGS

Advantageously the handle is formed integrally with the body.

The present invention will now be described, by way of example only, and with reference to the accompanying drawings, of which.

DETAILED DESCRIPTION OF THE PREFERRED EMBODIMENT

Figure 1:
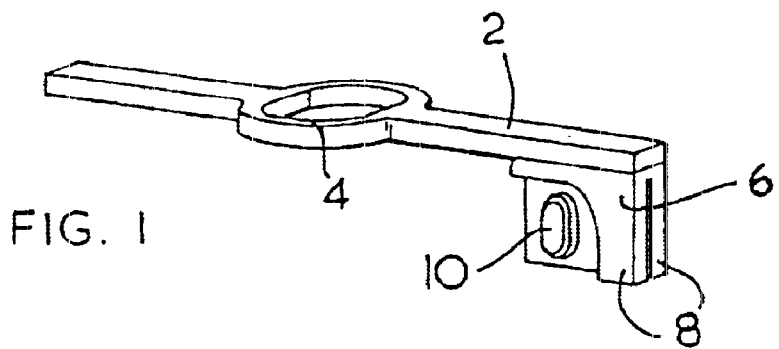
FIG. 1 shows a reciprocable shaft on which a saw blade may be mounted in accordance with an embodiment of the present invention.

Referring firstly to FIG. 1, there is shown a shaft (2) formed from pressed metal, such as steel, and having in the centre thereof a yoke (4). One end of the shaft (2) is formed integrally with a depending retaining member, here a blade mount (6). The blade mount (6) comprises a restraining means, here two arms (8) which depend from the shaft (2). The blade mount further includes a pin (10) which will be described in more detail below.

Figure 2:
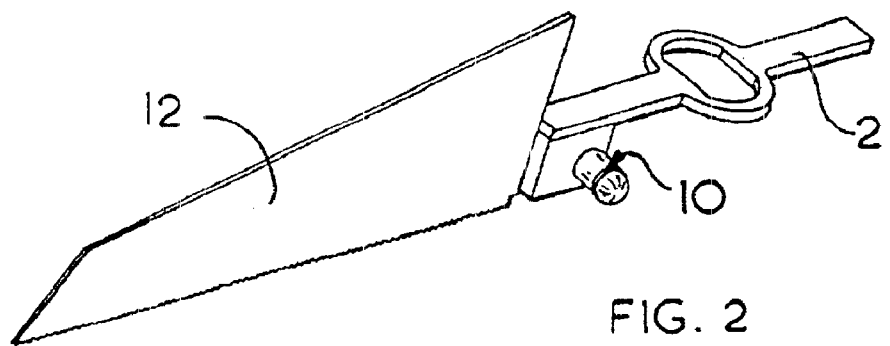
FIG. 2 shows the shaft of FIG. 1, but with a saw blade mounted thereon in an operating position from one side.
Figure 3:
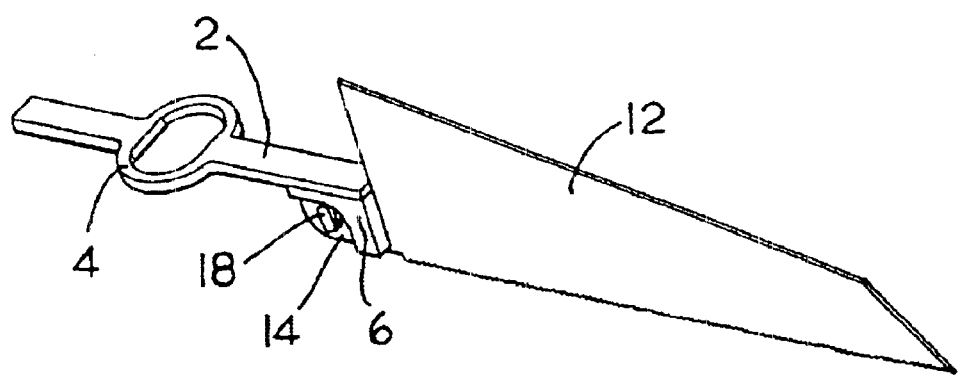
FIG. 3 shows the view of FIG. 2, but from the other side of the saw blade.

Referring now also to FIGS. 2 and 3, it can be seen that the shaft (2) is arranged to drive a saw blade (12) presented thereto and which is mounted on the blade mount (6). It can be seen that the saw blade (12) has a shank (14) which has formed therein a hole (16) (see more clearly FIGS. 5, 8 and 9) for mounting the blade (12) on a lug (18) of the pin (10).

Figure 4:
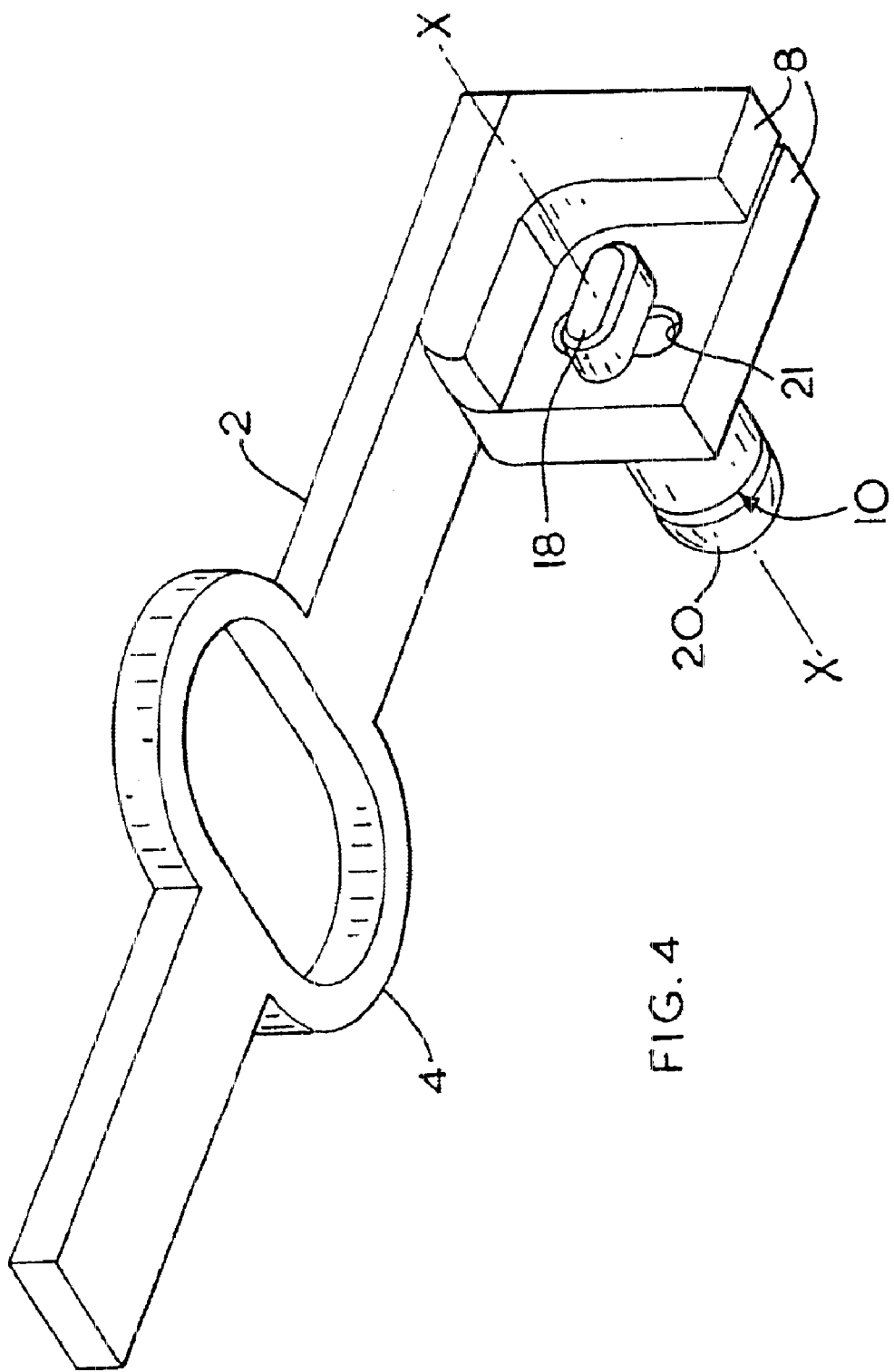
FIG. 4 shows a side view of the reciprocable shaft of FIG. 1, but with the retaining member thereof being in an unlocked position.

Referring now to FIG. 4, it can be seen that the pin (10) comprises a head (20) formed on one side of the blade mount (6) and a lug (18) co-operating with the head (20) formed on the other side of the blade mount (6). The shape of the lug (18) is the same as that of the hole (16) formed in the blade (12). This allows for the blade (12) to be mounted snugly on the lug (18).

The pin (10) is rotatable about its axis shown as X—X in FIG. 4 and it can be seen from this figure that the blade mount (6) has a recess (21) formed therein such that the lug (18) may sit within the recess (21) when it is in one of two positions. Because the pin (10) is rotatable about the axis X—X, then whenever the lug (18) is aligned with the recess (21) (in either of two positions 180° apart) then it will fit within the recess (21). In any other position, the lug (18) cannot sit within the recess (21).

In order for the lug (18) to be selectively aligned or not with the recess (21), the head (20) of the pin (10) is spring biased. In this manner, therefore, whenever the lug (18) is aligned with the recess (21) it "pops" into the recess and is held therein until the user exerts sufficient force against the head (20) against the action of the spring (described later below) to force the lug (18) out of the recess (21) and therefore allow the pin (10) to be rotated about the axis X—X.

Figure 5:
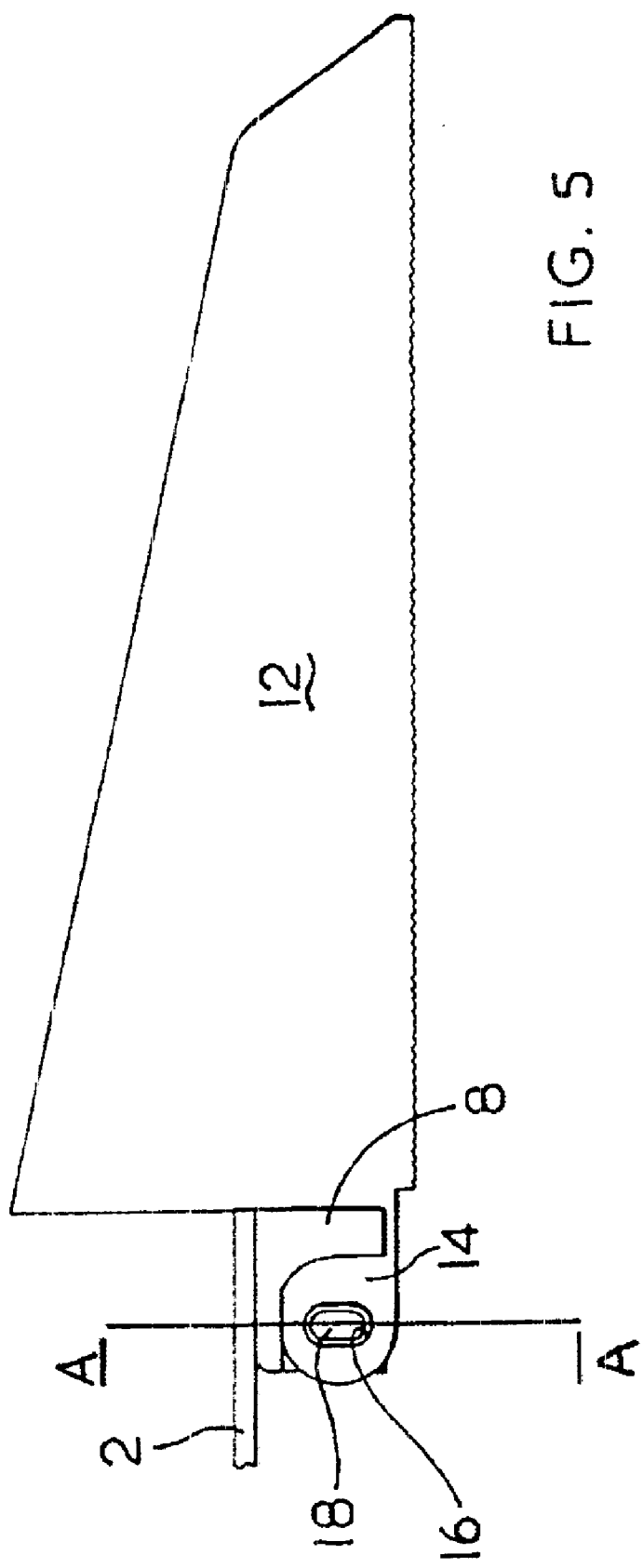
FIG. 5 shows the shaft of FIG. 1 with the saw blade mounted thereon in a locked position.

Referring now additionally to FIG. 5, it can be seen that the saw blade (12) is held in its locked position (because the lug (18) is within the recess (21)) against the shaft (2). Because the shaft (2) is arranged to reciprocate, that is drive the blade (12) backwards and forwards along a linear path, then it will be understood that each of the arms (8) is arranged to flank the shank (14) of the blade (12) to prevent the blade (12) from becoming detached from the blade mount (6). This because the arms (8) prevent any movement of the blade (12) in a direction perpendicular to the direction of reciprocation of the shaft (2).

In order to understand the operation of the pin (10) and its interaction with the blade (12), reference will now be made in particular to FIGS. 5, 6 and 7.

Figure 6:
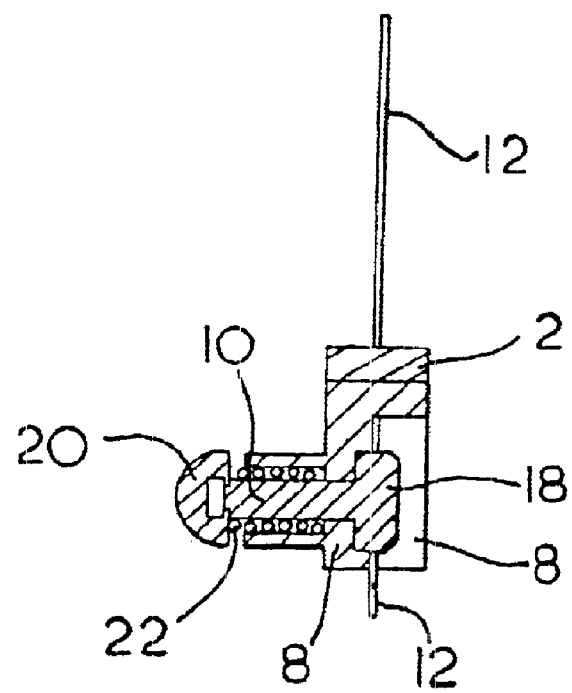
FIG. 6 shows a sectional view along the line A—A of FIG. 5.

The pin (10) is spring biased, and in the case of FIG. 6, it can be seen that the head (20) of the pin (10) has not been depressed and therefore under the action of the spring (22), the head (20) is forced to the left of FIG. 6 therefore allowing the lug (18) to sit within the recess (21). This does, of course, presuppose that the lug (18) is aligned with the recess (21) as has been described here above. Assuming this to be the case, then the blade will be locked in this position. Rotation of the pin and therefore the lug (18) are not possible because the lug (18) is located within the housing (20).

Figure 7:
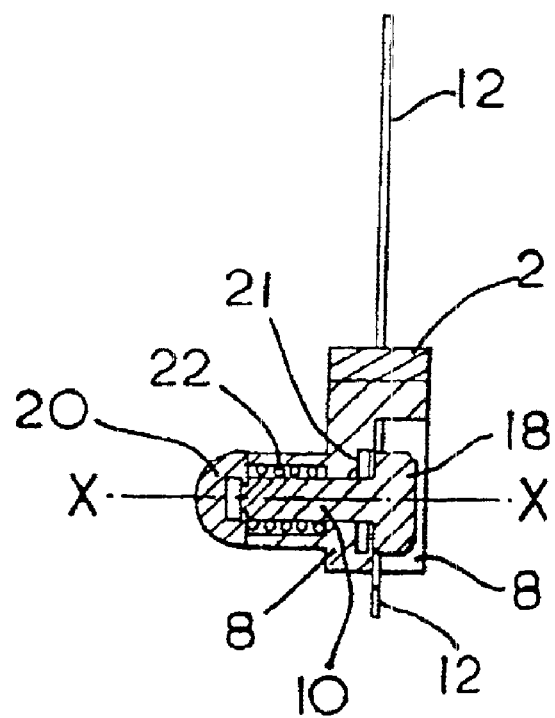
FIG. 7 is a view like FIG. 6 with the pin pushed inward.

Referring now to FIG. 7, it will be described how the lug (18) is released from the recess (21) in order to allow rotation of the saw blade (12).

Figure 8:
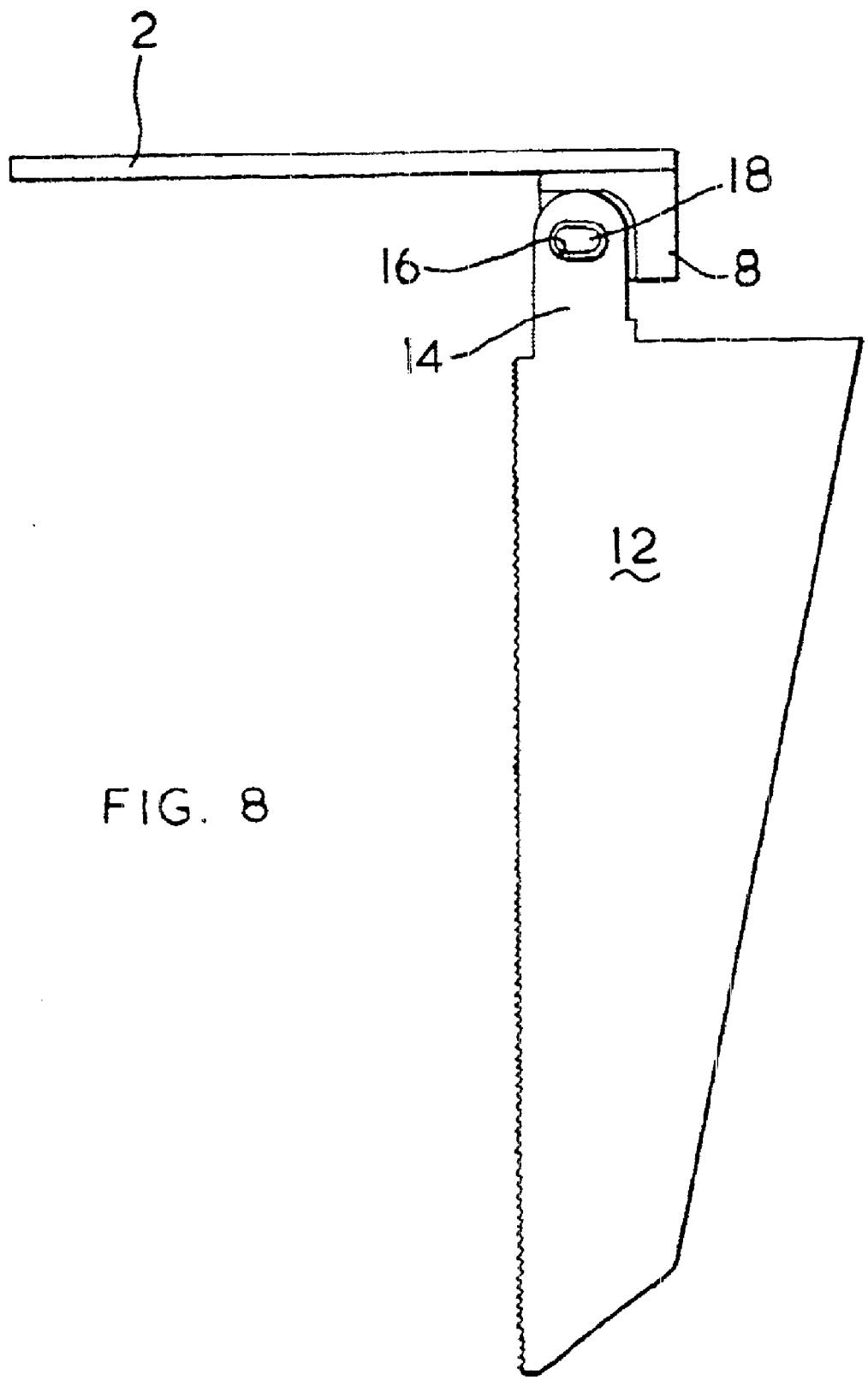
FIG. 8 shows a side view of a saw blade and the reciprocable shaft of FIGS. 2 and 3 in an unlocked position.

In FIG. 7 the user has pushed the head (20) to the right of the figure and therefore caused compression of the spring (22). The movement of the pin (10) to the right of the figure releases the lug (18) from the recess (21) and therefore allows rotation of the pin (10) about its axis X—X. Because the lug (18) is now no longer located within the recess (21) then rotation of the pin (10) means that the blade (12) may be rotated as well. Referring also to FIG. 8, this shows how the saw blade (12) has been rotated through 90° as compared with the locked position of FIG. 5.

Whilst referring to FIG. 8, it can be seen that, because the blade (12) is now perpendicular to the shaft (2) rather than parallel therewith as was the case in FIG. 5, then the shank (14) of the saw blade (12) is no longer constrained by the arms (8) of the blade mount (6). This means that the entire blade (12) may be removed from the lug (18) and could, for example, be replaced by an alternative saw blade.

Figure 9:
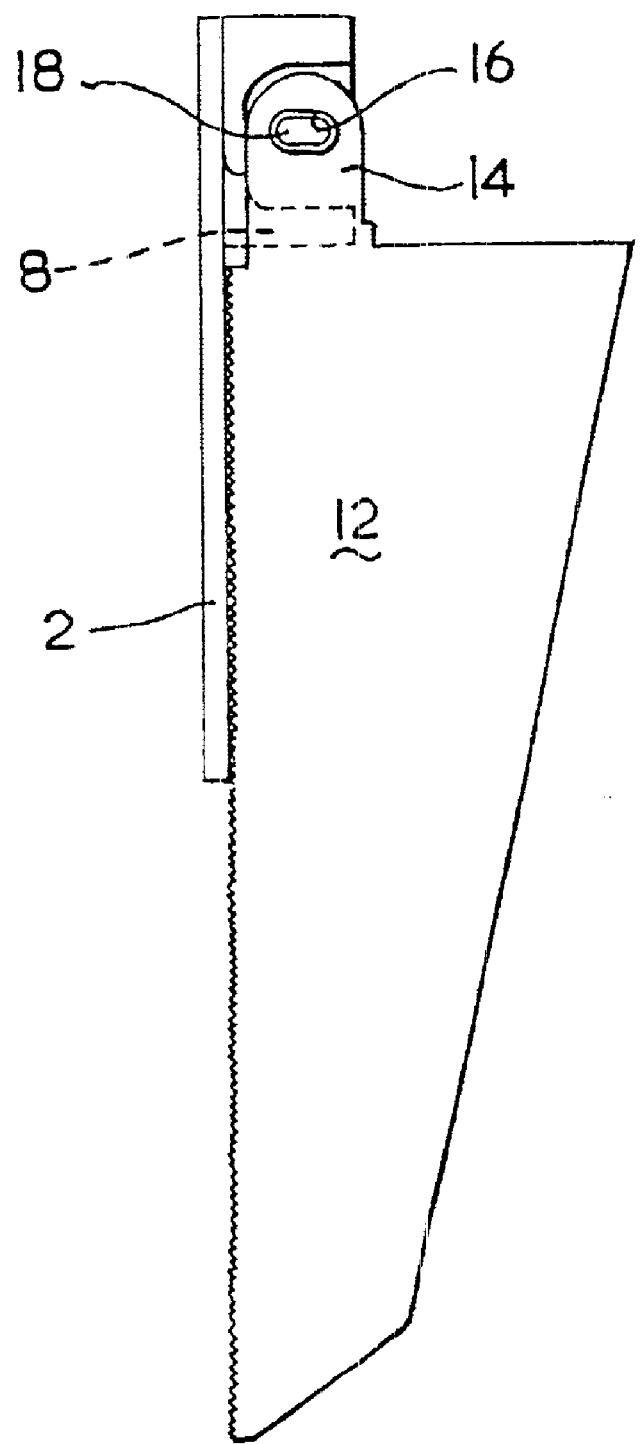
FIG. 9 shows the view of FIG. 8, but with the saw blade now retained in its stored and locked position.

Referring now to FIG. 9, it can be seen that further rotation of the pin (10) and the blade (12) is possible (because there is no alignment between the lug (18) and the recess (20)). The saw blade (12) as shown in FIG. 9 has now been rotated through 180° with respect to that of FIG. 5. It will be appreciated that the lug (18) is now realigned with the recess (21) and therefore if the user ceases to apply any force to the head (20) of the pin (10), then the lug (18) may fall back into the recess (21) and therefore lock the saw blade (12) in the position shown. This may be useful when the saw is to be carried around but the blade needs to be kept safely within the body of the saw, for example, to avoid injuring a user or damage to the saw blade.

Although only shown in dotted outline in FIG. 9, it will understood that a further pair of arms (8) may be employed in the blade mount (6) to retain the saw blade (12) in the position shown.

Figure 10:
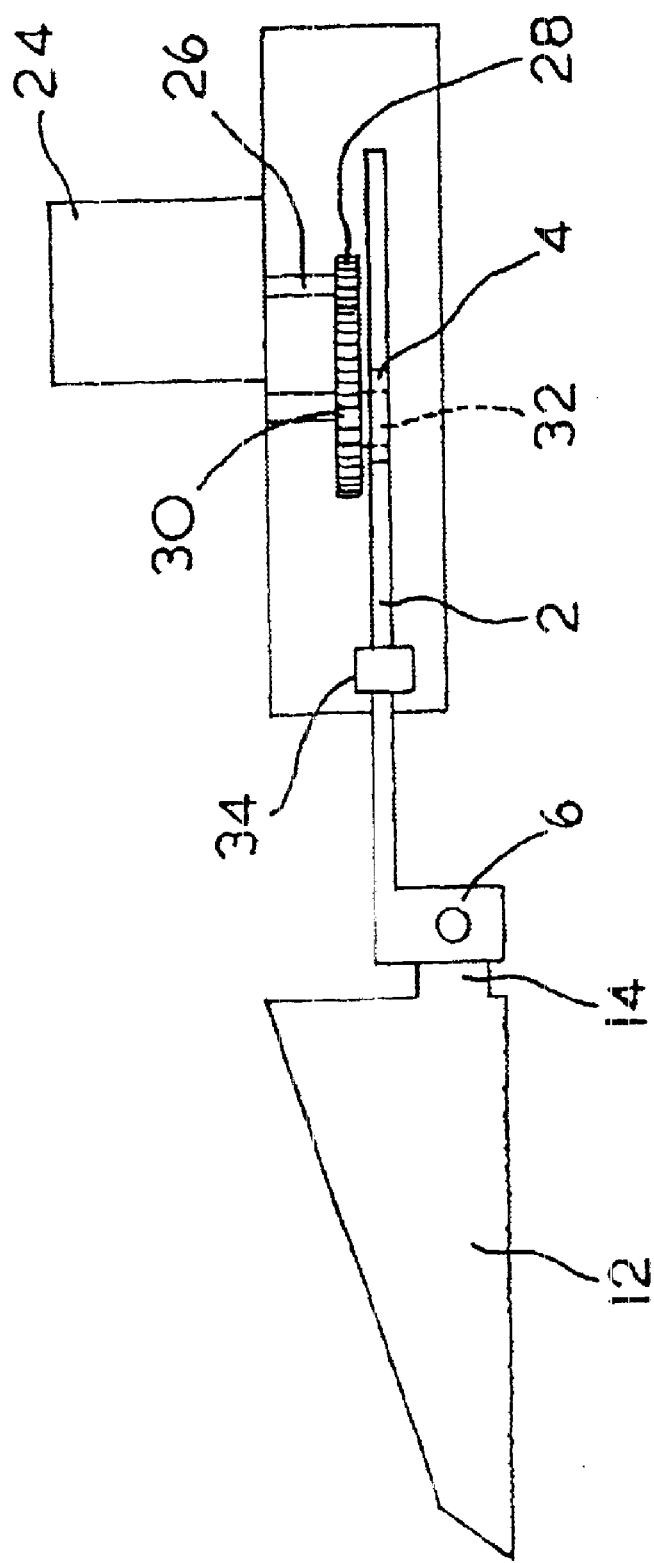
FIG. 10 shows a schematic illustration of the motor and internal mechanisms of a power tool in accordance with an embodiment of the present invention.
Figure 11:
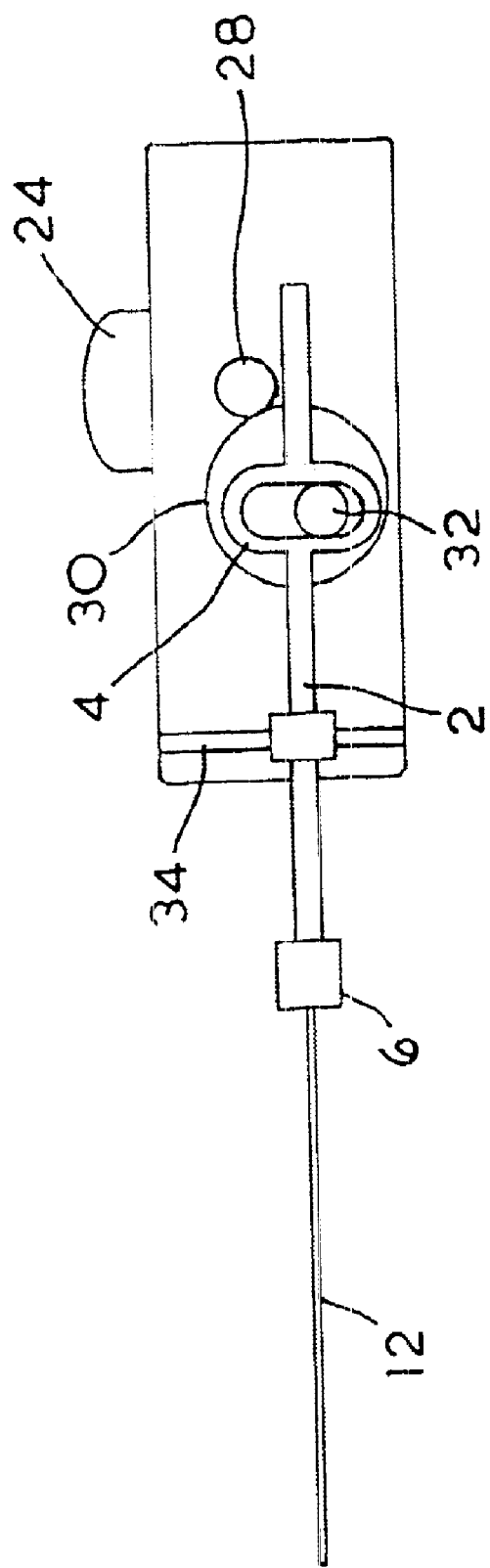
FIG. 11 shows a schematic side representation of FIG. 10.

Referring now to FIGS. 10 and 11 particularly, the internal mechanism of the power tool embodying the present invention will be described. In these examples, the power tool is a power saw.

An electric motor (24) is operable in conventional manner to drive a motor spindle (26) coupled to a drive wheel (28). The teeth of the drive wheel (28) mesh with the teeth of a gear wheel (30) having formed thereon an eccentric (32). Although not shown in the drawings, the eccentric (32) must be counter-balanced and those skilled in the art will appreciate this fact.

The eccentric (32) fits into the yoke (4). In this way, when the motor (24) is activated, it drives the drive wheel (28) which in turn causes rotation of the gear wheel (30). The circular movement of the eccentric (32) sitting in the yoke (4) therefore causes a linear reciprocal motion of the shaft (2) in a right-left-right motion as the drawings are viewed. In order to ensure that the only motion of the shaft (2) at the operative end (that is where the blade (12) and the blade mount (6) are situated) occurs, a retaining bar (34) having linear bearings surrounds the shaft (2). This restrains movement of the shaft only in the left-right-left linear direction.

Whilst in the above examples of FIGS. 10 and 11 only one drive wheel (28) is shown, those skilled in the art will appreciate that any desired gearing arrangement may be used. The choice of gearing arrangement will depend primarily on the step up/step down requirement between the rotational output speed of the motor (24) and the frequency of linear reciprocation needed for the shaft (2).

Figure 12:
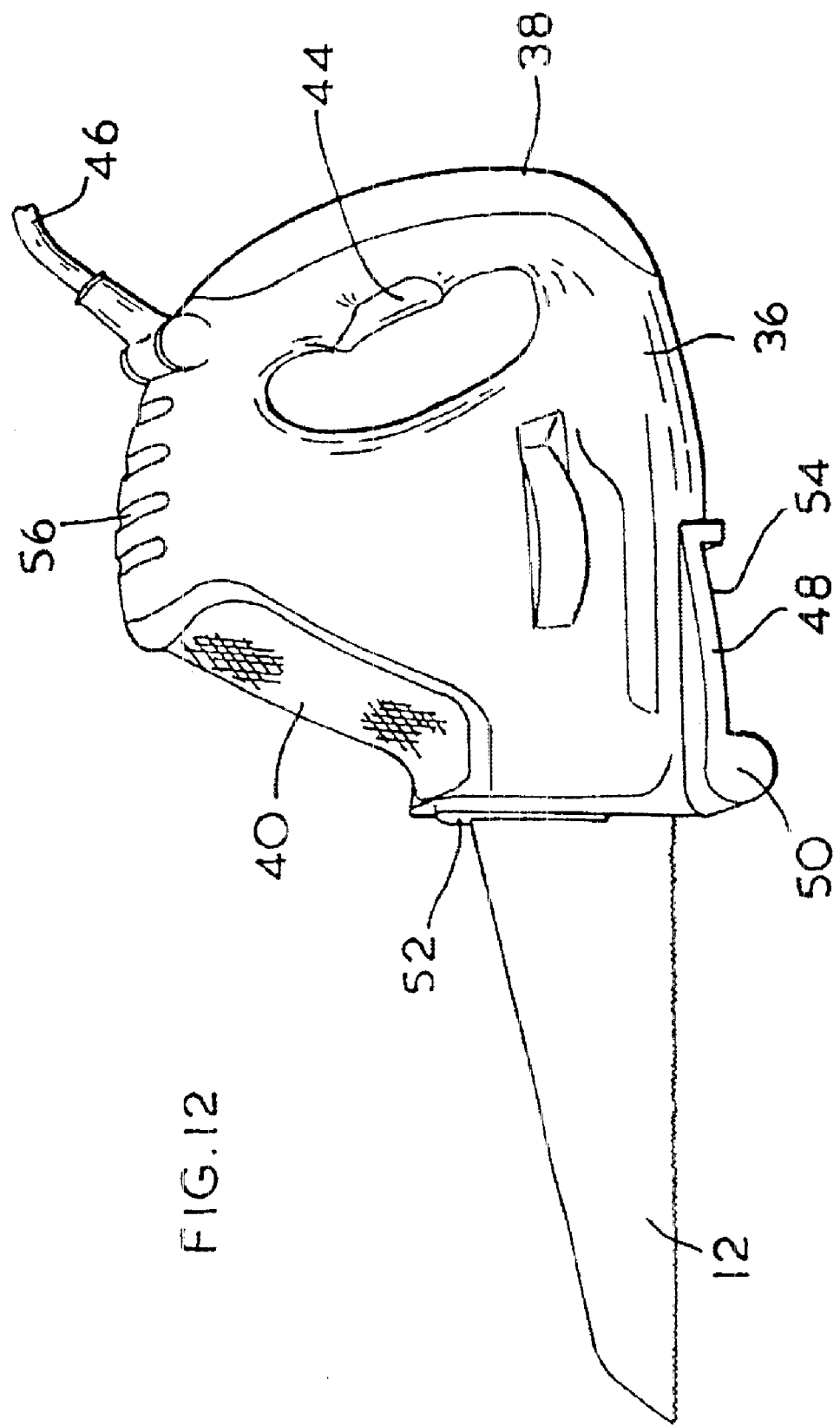
FIG. 12 shows a side view of a powered saw in accordance with an embodiment of the present invention.
Figure 13:
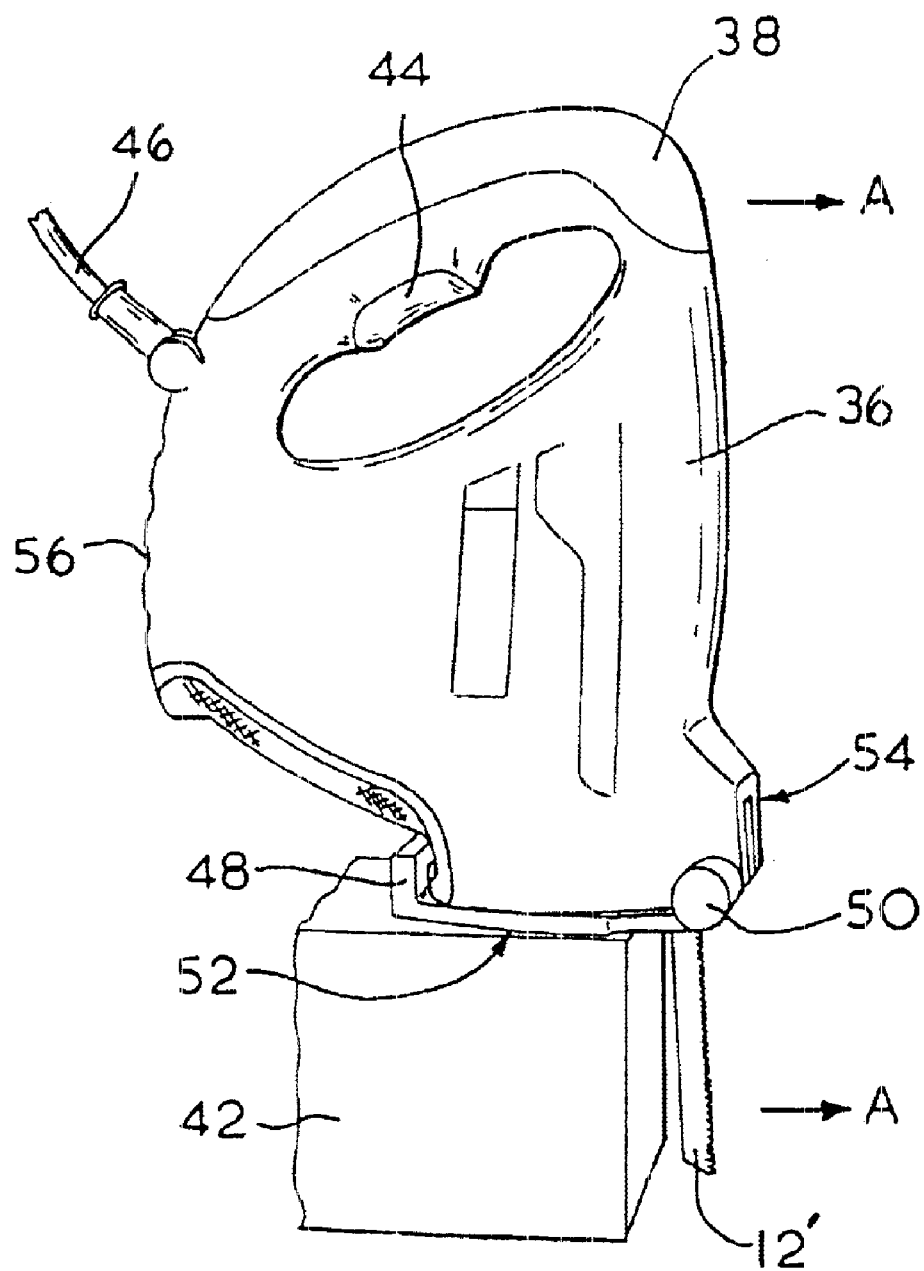
FIG. 13 shows a side view of an alternative use of a powered saw to that of FIG. 12.

Referring now particularly to FIGS. 12 and 13, two further embodiments of the present invention are now described. It can be seen by comparing these two figures, that the power tools shown therein share the same body (36). However, the tools shown in FIGS. 12 and 13 each are used for a different purpose and operate in different modes, as will be described here below. It should be understood that, for the purposes of FIGS. 12 and 13, the internal mechanism as shown in FIGS. 10 and 11 is incorporated therein. However, because FIGS. 12 and 13 show the tool from the outside, then the internal mechanisms cannot be seen.

In FIG. 12, the tool is used as a so-called panel saw. Panel saws are generally used for sawing large pieces of wood and the like in the form of blocks such as logs. In the present invention, it has been found desirable to be able to offer the user the facility of using the panel saw not only in its powered mode but also manually. That is, the user should be able to grip the handle (38) of the panel saw and use it as a conventional manually operated saw whether the blade is being driven by the motor (24) or not. To achieve this the saw needs to be lightweight but also it has been found that, when the saw is being driven by the motor (24), conventional reciprocating action will prevent manually using the tool with ease, because of the combination of the frequency of reciprocation of the saw blade (12) and the length of each reciprocal stroke.

Conventionally, it has been found that the frequency of reciprocation of the blade (12) has been around 3,000 strokes per minute. Additionally, the length of each reciprocal stroke has been in the region of 20 mm. The combination of this particular frequency and stroke length results in large vibrational forces being felt by the user. Additionally, this creates large interial forces which also need to be overcome in order to be able to use the saw manually. With a conventional panel saw, therefore, if the user wishes to use it manually rather than in its conventional powered mode, a degree of discomfort would be felt because the saw would be vibrating at a frequency which does not lend itself to holding the saw comfortably. Additionally, the amplitude of each reciprocal stroke of the blade (12) is so large that high inertial forces are felt by the user mean that to be able to pull and push the saw in a manual mode is not easily achievable.

It has been found that by reducing the length of each reciprocal stroke to preferably around 10 mm and concomitantly increasing the reciprocal stroke frequency to preferably around 6,500 strokes per minute, that this combination of lower stroke length and higher frequency results in less adverse vibrational and inertial forces being felt by the user. This then enables the panel saw of FIG. 12 to be used as a manual saw simply by holding the handle (38). Additionally, if the user requires a further grip on the body (36), a recess, formed as insert (40) is available for gripping by the other hand of the user (that is the hand which does not grip the handle (38)).

Although in the example described with reference to FIG. 12 the preferred frequency of oscillation has been given as 6,500 strokes per minute, the present invention has been found to operate effectively with a frequency of vibration between 3,000 and 10,000 strokes per minute. Similarly, although the preferred amplitude of each reciprocal stroke is given as 10 mm, it has been found that the present invention works effectively with a range of 5 to 15 mm.

Referring now also to FIG. 13, it can been seen that the same body (36) is used with a different saw blade (12'). Indeed, the saw blade (12') is that found on conventional "jigsaws". Jigsaws are tools which are used with relatively small saw blades and are used for cutting accurate shapes in a workpiece. Conventionally, jigsaws are held relative to the workpiece in a different attitude to panel saws. This can be seen by reference to the difference in attitude between FIG. 12 and 13. In FIG. 13, the body (36) can be seen resting on a block (42) which represents a workpiece. In use of the jigsaw, the body (36) would be held on the block (42) in the attitude shown in FIG. 13.

It can be seen from FIG. 13 that the handle (38) is now positioned relative to the workpiece (42) such that the body (36) may easily be used as a jigsaw. In use of the jigsaw, a user exerts a force via the handle (38) in the direction of the large arrow marked "A". This is so that the blade (12') is driven also in the direction of the arrow "A" to cut through the workpiece.

It can be seen by comparing FIGS. 12 and 13, that the handle (38), although itself the same in both figures, it able to be used for exerting forces in a different direction depending on which mode of use (either the panel saw of FIG. 12 or the jigsaw of FIG. 13) the tools are put to.

The handle (38) is positioned adjacent a trigger (44) which trigger (44) is operable by user when the handle (38) is gripped.

It can be seen from both FIGS. 12 and 13, therefore, that the position of the handle (38) relative to the body (36) is such that the user may operate the saw in a plurality of positions relative to a workpiece. Thus, regardless of whether the tool is being used as a panel saw in FIG. 12 or a jigsaw in FIG. 13, the same handle is used for operating the saw. It will be appreciated by those skilled in the art, that this holds true whether the panel saw of FIG. 12 is being used as a powered saw by powering the motor (24) via an electricity supply cable (46), or whether it is being used manually.

In the examples shown, the trigger (44) is formed integrally with the handle (38). This need not necessarily be the case, and the trigger may be formed separately or indeed on another part of the body (36).

From FIGS. 12 and 13, therefore, it can be seen that the handle (38) is accessible from one of two sides, depending on whether the tool is to be used as a panel saw or a jigsaw. It is envisaged that the present invention is of scope to allow more than two sides of the handle (38) to be used depending on the purpose to which the tool is being put.

It can be seen from FIGS. 12 and 13, that the body (36) also includes a pivotable sole plate (48). The sole plate (48) is pivotable about pivot point (50). The pivot point (50) includes a means (not shown) for allowing the sole plate (48) to be held at any one of a desired position around the range of possible pivotable positions about the point (50). In the example of FIG. 12, the sole plate (48) is tucked underneath the body (36). In the example of FIG. 13, the sole plate (48) is pivoted through 270° so as to act as the guide sole plate for a conventional jigsaw. In this mode, the blade (12') passes through the sole plate (48) when used in its jigsaw mode.

Those skilled in the art will appreciate that, conventionally, jigsaws use a sole plate (48) to act as a guide when cutting a workpiece. In the example of FIG. 13, although it cannot be seen from the drawing, the sole plate (48) includes visual indicia to allow the user to see exactly where the blade (12') will cut the workpiece when viewed from above the body (36).

It can be seen by comparing FIGS. 12 and 13, therefore, that the body (36) defines two working surfaces (52 and 54) dependent upon which mode the tool is being used. In the examples above, working surface (52) is used for the jigsaw mode of FIG. 13 and working surface (54) is used for the panel saw mode of FIG. 12.

It will be understood by those skilled in the art that the sole plate (48) may be positioned at any suitable angle relevant to the body (36) dependent upon the use to which the tool is being put.

By referring now particularly to FIG. 13 it can be seen that, when the tool is used as a jigsaw, a user may also grip the dimpled surface (56) in order to assist with guiding the tool during use. Alternatively, this surface (56) can be used to form cooling vents within the body of the saw.

What is claimed is:

1. A power tool comprising:
    a body housing a motor and a drive mechanism for driving a fixed output permanently coupled with said drive mechanism, the body including a handle to enable a user to manually hold and operate the power tool;
    a trigger positioned adjacent to and substantially at a center portion of the handle, the trigger being operable by the user when the user is gripping the handle, said handle having a gripping surface positioned relative to the body and is on an angle with respect to an axis of a blade, said gripping surface enabling the power tool to be operated in a plurality of positions;
    said handle is positioned with respect to said body such that as a force is applied on the handle along a line of action, the power tool operates along the line of action regardless of a given one of the plurality of positions of the power tool and regardless of the direction of the line of action, the gripping surface is on the same angle with respect to the axis of the blade; and
    the power tool gripping surface enables the user access to said handle from more than one side such that said trigger being operated by motor motions of the user, which motor motions being substantially the same during operation in the plurality of different positions, each accessible side corresponding to the given one of the plurality of different positions such that when the blade is substantially horizontal, the power tool acts as a panel saw and when the blade is substantially vertical, the power tool acts as a jigsaw and said body including a guide that rests upon a workpiece when said power tool is used as a jigsaw and said guide is pivotally secured to said body to move out of contact with a workpiece when said power tool is used as a panel saw.

2. A power tool according to claim 1, wherein the handle is formed integrally with the body.

3. A power tool according to claim 1, wherein the tool is operable as said jigsaw or said panel saw Independent of which of the accessible sides of the handle is used.

4. A power tool according to claim 1, wherein the trigger is formed integrally with the handle.

5. A power tool according to claim 4, wherein the handle is formed integrally with the body.

6. A power tool according to claim 1, wherein the power tool being operated in two modes, each of which modes corresponds to one of the accessible sides of the handle.

7. A power tool according to claim 6, wherein the handle is formed integrally with the body.

* * * * *